US007974894B2

(12) United States Patent
Baron et al.

(10) Patent No.: US 7,974,894 B2
(45) Date of Patent: Jul. 5, 2011

(54) METHODS AND SYSTEMS FOR CLASSIFYING ENTITIES ACCORDING TO METRICS OF EARNINGS QUALITY

(75) Inventors: Neil Baron, Armonk, NY (US); Scott A. Richardson, Philadelphia, PA (US); Antonio Figueiredo, Jersey City, NJ (US); James Nadler, Summit, NJ (US)

(73) Assignee: Institutional Shareholder Services Inc., Rockville, MD (US)

( * ) Notice: Subject to any disclaimer, the term of this patent is extended or adjusted under 35 U.S.C. 154(b) by 1192 days.

(21) Appl. No.: 11/073,096

(22) Filed: Mar. 4, 2005

(65) Prior Publication Data
US 2005/0267828 A1    Dec. 1, 2005

Related U.S. Application Data

(60) Provisional application No. 60/549,944, filed on Mar. 5, 2004, provisional application No. 60/591,943, filed on Jul. 29, 2004.

(51) Int. Cl.
*G06Q 40/00* (2006.01)
(52) U.S. Cl. ............... 705/35; 705/36; 705/38; 705/39; 705/44
(58) Field of Classification Search ............. 705/35–45
See application file for complete search history.

(56) References Cited

U.S. PATENT DOCUMENTS

| 6,374,358 | B1 * | 4/2002 | Townsend | 726/1 |
| 6,877,034 | B1 * | 4/2005 | Machin et al. | 709/223 |
| 7,003,503 | B2 * | 2/2006 | Crosby et al. | 706/48 |
| 2003/0110065 | A1 * | 6/2003 | Twigge-Molecey | 705/7 |
| 2004/0117240 | A1 * | 6/2004 | Ness et al. | 705/10 |
| 2004/0117283 | A1 * | 6/2004 | Germack | 705/35 |
| 2005/0021389 | A1 * | 1/2005 | Dias et al. | 705/10 |

OTHER PUBLICATIONS

Instructional case: Detecting earnings manipulation, Christine Wiedman, v14n1, pp. 145-176, Feb. 1999, ISSN: 0739-3172, Journal Code: AIIA.*
Scott A. Richardson, "Discussion—A League of Their Own? Financial Analysts' Responses to Restatements and Corrective Disclosures", Journal of Accounting Auditing & Finance, Vo. 18, No. 4, pp. 519-528 (Fall 2003) (11 pp.).
Scott A. Richardson et al., "Do Analysts and Auditors Use Information in Accruals", Journal of Accounting Research, vol. 39, No. 1, pp. 45-74 (Jun. 2001) (30 pp.).
Richard G. Sloan, "Do Stock Prices Fully Reflect Information in Accruals and Cash Flows About Future Earnings?", The Accounting Review, Vo. 71, No. 3, pp. 289-315 (Jul. 1996) (27 pp.).

(Continued)

*Primary Examiner* — Ella Colbert
*Assistant Examiner* — Hai Tran
(74) *Attorney, Agent, or Firm* — Hunton & Williams, LLP

(57) ABSTRACT

Methods and systems for classifying entities according to metrics of earnings quality are provided. At least one value corresponding to earnings quality of an entity is generated based on at least one metric of accruals, and the entity is classified according to the at least one value. For example, the entity may be classified according to the value as likely to have overstated its earnings and/or as likely to experience one or more business outcomes (e.g., a change in stock price, SEC enforcement action, and/or class-action lawsuit). As another example, multiple entities may be separated into various classes by ranking the entities according to their respective values. Such a ranking may provide useful heuristics regarding whether the entities have manipulated (e.g., overstated or understated) their earnings. Information about the classification may be made available for a fee and may allow parties to make better business and regulatory decisions.

24 Claims, 12 Drawing Sheets

OTHER PUBLICATIONS

Scott A. Richardson, et al., "Capital Market Pressures and Earnings Management: The case of earnings restatements", Sep. 2003 (37 pp.).

Scott A. Richardson, et al., "Accrual Reliability, Earnings Persistence and Stock Prices", First Version: Jul. 2001, This version: Jan. 2004, (65 pp.).

Sanjeev Bhorjraj and Bhaskaran Swaminathan, "How Does the Corporate Bond Market Value Capital Investments and Accruals?", First Draft: Aug. 2003, Current Draft: Dec. 2003 (31 pp.).

Advisen Press Release, "Advisen Predicts D&O Risk Through Examination of Accounting Practices", Oct. 4, 2004 (2 pp.).

Advisen publication including "Introduction to Advisen's ATAcm", around Oct. 2004 (5 pp.).

\* cited by examiner

400 m3 = Industry-Adjusted Earnings Quality Value =

402  406                                404

Basic Value − Average of the Basic Values for Entities in the Same Industry

FIG. 4

500 m4 = Performance-Adjusted Earnings Quality Value =

502  506                                504

Basic Value − Average of the Basic Values for the Performance Decile

Return on Assets =

Operating Income

―――――――――――

Average Total Assets

FIG. 5

Operating Accruals Classification
All non-financial firms for the period 1988-2001

| Earnings Quality Decile | Range : Lower Bound - Upper Bound | | |
|---|---|---|---|
| 1 | -693 | to | -0.247 |
| 2 | -0.247 | to | -0.143 |
| 3 | -0.143 | to | -0.099 |
| 4 | -0.099 | to | -0.072 |
| 5 | -0.072 | to | -0.052 |
| 6 | -0.052 | to | -0.033 |
| 7 | -0.033 | to | -0.012 |
| 8 | -0.012 | to | 0.018 |
| 9 | 0.018 | to | 0.076 |
| 10 | 0.076 | to | 37 |

FIG. 6

Operating Accruals Classification
Automobile and Truck Industry (2001 data)

| Earnings Quality Decile | Range : Lower Bound - Upper Bound | | |
|---|---|---|---|
| 1 | -6.36 | to | -0.345 |
| 2 | -0.345 | to | -0.196 |
| 3 | -0.196 | to | -0.120 |
| 4 | -0.120 | to | -0.100 |
| 5 | -0.100 | to | -0.089 |
| 6 | -0.089 | to | -0.071 |
| 7 | -0.071 | to | -0.054 |
| 8 | -0.054 | to | -0.035 |
| 9 | -0.035 | to | 0.010 |
| 10 | 0.010 | to | 0.251 |

FIG. 7

Operating Accruals Classification
Healthcare Industry (2001 data)

| Earnings Quality Decile | Range : Lower Bound - Upper Bound | | |
|---|---|---|---|
| 1 | -11.98 | to | -0.462 |
| 2 | -0.462 | to | -0.268 |
| 3 | -0.268 | to | -0.175 |
| 4 | -0.175 | to | -0114 |
| 5 | -0.114 | to | -0.092 |
| 6 | -0.092 | to | -0.074 |
| 7 | -0.074 | to | -0.043 |
| 8 | -0.043 | to | -0.012 |
| 9 | -0.012 | to | 0.022 |
| 10 | 0.022 | to | 0.581 |

FIG. 8

Operating Accruals Classification
Medical Equipment Industry (2001 data)

| Earnings Quality Decile | Range : Lower Bound - Upper Bound | | |
|---|---|---|---|
| 1 | -88.8 | to | -0.272 |
| 2 | -0272 | to | -0.168 |
| 3 | -0.168 | to | -0.119 |
| 4 | -0.119 | to | -0.085 |
| 5 | -0.085 | to | -0.054 |
| 6 | -0.054 | to | -0.031 |
| 7 | -0.031 | to | -0.012 |
| 8 | -0.012 | to | 0.022 |
| 9 | 0.022 | to | 0.079 |
| 10 | 0.079 | to | 1.403 |

FIG. 9

Operating Accruals Classification
Pharmaceutical Products Industry (2001 data)

| Earnings Quality Decile | Range : Lower Bound - Upper Bound | | |
|---|---|---|---|
| 1 | -18.721 | to | -0.440 |
| 2 | -0.440 | to | -0.252 |
| 3 | -0,252 | to | -0.159 |
| 4 | -0.159 | to | -0.089 |
| 5 | -0.089 | to | -0.067 |
| 6 | -0.067 | to | -0.047 |
| 7 | -0.047 | to | -0.029 |
| 8 | -0.029 | to | -0.011 |
| 9 | -0.011 | to | 0.027 |
| 10 | 0.027 | to | 1.11 |

FIG. 10

Operating Accruals Classification
Telecommunications Industry (2001 data)

| Earnings Quality Decile | Range : Lower Bound - Upper Bound | | |
|---|---|---|---|
| 1 | -12.57 | to | -0.821 |
| 2 | -0.821 | to | -0.388 |
| 3 | -0.388 | to | -0.224 |
| 4 | -0.224 | to | -0.155 |
| 5 | -0.155 | to | -0.123 |
| 6 | -0.123 | to | -0.093 |
| 7 | - -0.093 | to | -0.073 |
| 8 | -0.073 | to | -0.051 |
| 9 | -0_051 | to | -0.023 |
| 10 | -0.023 | to | 0.424 |

FIG. 11

Operating Accruals Classification
Utilities Industry (2001 data)

| Earnings Quality Decile | Range : Lower Bound - Upper Bound | | |
|---|---|---|---|
| 1 | -54.242 | to | -0.127 |
| 2 | -0.127 | to | -0.074 |
| 3 | -0.074 | to | -0.059 |
| 4 | -0.059 | to | -0.044 |
| 5 | -0.043 | to | -0.034 |
| 6 | -0.034 | to | -0.028 |
| 7 | -0.028 | to | -0.019 |
| 8 | -0.019 | to | 0.004 |
| 9 | 0.005 | to | 0.042 |
| 10 | 0.043 | to | 0.717 |

FIG. 12

Percentage of Class-Action Lawsuits (Y axis) versus
Earnings Quality Decile (X axis)

Mean Change In OAS Basis Points (Y axis) versus
Earnings Quality Decile (X axis)
Adjusted for Rating and Duration

| Decile | Mean | Bottom Quartile Cut-Off | Median | Top Quartile Cut-off |
|---|---|---|---|---|
| 1 | -49 | -183 | -9 | 102 |
| 2 | 10 | -155 | -17 | 106 |
| 3 | 0 | -151 | 0 | 128 |
| 4 | 22 | -124 | 0 | 125 |
| 5 | 53 | -128 | 0 | 164 |
| 6 | 72 | -141 | 0 | 151 |
| 7 | 47 | -120 | 0 | 142 |
| 8 | 31 | -120 | 6 | 149 |
| 9 | 78 | -140 | -9 | 181 |
| 10 | 123 | -130 | 23 | 271 |

| Decile | Mean | Bottom Quartile Cut-Off | Median | Top Quartile Cut-off |
|---|---|---|---|---|
| 1 | -42 | -178 | 0 | 121 |
| 2 | 21 | -145 | -3 | 121 |
| 3 | 8 | -137 | 0 | 128 |
| 4 | 32 | -115 | 0 | 134 |
| 5 | 64 | -115 | 1 | 164 |
| 6 | 84 | -118 | 8 | 168 |
| 7 | 61 | -100 | 18 | 148 |
| 8 | 45 | -104 | 23 | 157 |
| 9 | 97 | -129 | 0 | 208 |
| 10 | 147 | -97 | 43 | 306 |

METHODS AND SYSTEMS FOR CLASSIFYING ENTITIES ACCORDING TO METRICS OF EARNINGS QUALITY

CROSS-REFERENCE TO RELATED APPLICATIONS

This claims the benefit of U.S. Provisional Patent Application Ser. Nos. 60/549,944, filed Mar. 5, 2004, and 60/591,943, filed Jul. 29, 2004, which are hereby incorporated by reference herein in their entireties.

FIELD OF THE INVENTION

This invention relates generally to methods and systems for classifying entities according to metrics of earnings quality. More particularly, this invention relates to methods and systems for classifying entities according to at least one metric of accruals. Information about the classification may be made available for a fee and may allow parties to make better business and regulatory decisions.

BACKGROUND OF THE INVENTION

Business entities engage in various activities typically reflected by their respective internal accounting systems. Periodically, the entities prepare and disseminate financial disclosures indicative of one or more financial considerations such as earnings. External parties (e.g., investors, stockholders, insurance companies, regulatory agencies, etc.) examine these disclosures to ascertain the financial health of the entities. Ideally, such examination allows the external parties to make informed business or regulatory decisions. For example, an insurance company may examine a financial disclosure of an entity in order to determine whether to insure the entity and at what premium cost.

Some business entities may engage in aggressive accounting practices that obscure their true financial health. A failure by an external party to detect this obscurity can lead to unsound business or regulatory judgments. For example, an entity may manipulate an accruals component of a financial disclosure in order to increase reported earnings, and the increased earnings may overstate the financial health of the entity. Accruals are typically associated with earnings that are not cash-based and therefore can be manipulated by, for example, managers attempting to offset poor economic performance. In other instances, adjustments of accruals can actually provide a more accurate depiction of an entity's financial health such as when, for example, accruals are adjusted to match current costs with related revenue. Whether an analyst can determine an entity's true financial health from one or more of the entity's financial disclosures may depend on the level of sophistication of the analyst and/or the quality of the analytical model that the analyst is using to examine the financial disclosures. For example, individuals who purchase stock on their own behalf may be unfamiliar with, and therefore unable to detect and/or analyze, indicators of aggressive accounting practices.

Moreover, often times it is desirable to compare the performance of entities such as, for example, entities in the same industry or entities included in the S&P 500. Such a comparison may be extremely time-consuming and/or prohibitively expensive. In particular, the comparison may require an analyst to examine manually all of the current financial disclosures of the entities in question. Additionally, the analyst may be required to possess a threshold level of sophistication to make the comparison such as when, for example, the analyst is using an analytical model that utilizes a metric which must be derived from one or more financial disclosures.

In view of the foregoing, it would be desirable to provide methods and systems for classifying entities according to metrics of earnings quality.

SUMMARY OF THE INVENTION

This invention provides methods and systems for classifying entities according to metrics of earnings quality.

In accordance with an aspect of the invention, methods for qualifying earnings quality of an entity are provided. The entity may include a company, a corporation, a partnership, a non-profit organization, or any other business entity. At least one value corresponding to earnings quality of the entity may be generated, where the value is based on one or more metrics of accruals. The entity may be classified according to the at least one value, and information about the classification may be made available for a fee. The classification information may allow parties to make better business and regulatory decisions. For example, an insurance provider may use the classification information to determine what premium cost(s) should be charged by the provider to insure one or more entities (e.g., charging higher premiums for entities with lower earnings quality).

In accordance with another aspect of the present invention, the value corresponding to earnings quality may be generated based on a metric of total accruals, a metric of operating accruals, or a combination thereof. The value may be generated using financial information from one or more databases. For example, when the entity is a financial service institution (e.g., a bank, insurance company, or real estate investment trust (REIT)), the value may be generated using financial data from both the S&P Compustat database and the SNL database.

The classifying of entities in accordance with aspects of the present invention may involve classifying an entity as likely to have overstated its earnings and/or as likely to experience one or more business outcomes (e.g., a change in stock price, an SEC enforcement action, and/or a class-action lawsuit). This may involve identifying entities whose earnings appear to be overstated or understated, and therefore unsustainable, with respect to underlying cash flow generation (where accruals are the difference between earnings and cash flow generation) for a measured time period. A plurality of entities may be separated into various classes by ranking the entities according to their respective values of earnings quality. Such a ranking may provide useful heuristics regarding whether the entities have manipulated (e.g., overstated or understated) their earnings. For example, a business entity may report its belief that it will have to mark down its out-of-season merchandise by 40% instead of a traditional 20% mark-down due to the entity's belief that the economy is slow. The present invention may attempt to measure this embedded discretion by comparing the entity's financials to those of other entities, recognizing that entities who are more optimistic with respect to estimates of future earnings tend to underperform their financial forecasts, whereas entities who are more conservative with respect to future earnings tend to outperform their forecasts. In this example, it may well be that the entity will have future earnings levels higher or lower than anticipated by the entity (e.g., as a result of the out-of-season merchandise selling at a mark-down of 30% or 50%, respectively).

Another aspect of the present invention includes making information about the classification available for a fee and may involve making the classification information available through a network connection or through a local workstation to a client who has paid or has contracted to pay the fee. For example, this may involve receiving a request for access to the classification information from a computer device associated with a party, determining whether the party has paid or has contracted to pay the fee, and providing or denying the access based on the determination. In some embodiments of the present invention, making the classification information available for a fee may involve "pushing" (e.g., via e-mail) the information to a client. In some embodiments of the present invention, making the classification information available for a fee may involve encoding a computer-readable medium with the classification information and/or computer-executable instructions for performing at least one of the generating and the classifying functions, and offering the medium for sale to a consumer.

Various metrics may be provided for use in generating values corresponding to earnings quality in accordance with the present invention. These metrics include metrics of total accruals, metrics of operating accruals, metrics that adjust accruals values based on the industry of a given entity, and metrics that adjust accruals values based on the performance level of a given industry. With respect to industry-adjusted accruals metrics, analysis shows that the magnitude of accruals of an entity largely depends on the entity's business process and that these processes may vary significantly across industries. With respect to performance-adjusted accruals metrics, analysis shows that higher levels of accruals naturally occur for entities that are growing because these entities have growing receivables, inventories, and other working capital, all of which are non-cash items. Accordingly, adjusting accruals values for differences in industries and/or performance levels can separate instances where high accruals are less of a concern from instances where accruals are high because of manipulations.

Systems for providing access to earnings quality information are also provided in accordance with the present invention. An illustrative system may include a database comprising at least one value corresponding to earnings quality for an entity and a server for receiving and processing requests for access to the database from remote access devices. The system may provide a remote device with access to the database when a party associated with the device has paid or has contracted to pay an access fee. The system may also include an earnings quality application configured to generate the at least one value corresponding to earnings quality by, for example, retrieving financial data for the entity from one or more databases.

An aspect of the present invention provides that the earnings quality application may generate the at least one value using information uploaded to the server from a remote access device. For example, an entity may upload confidential information to the server in order to determine how external parties stand to perceive the entity should the entity decide to report the information in one or more financial disclosures.

BRIEF DESCRIPTION OF THE DRAWINGS

For a better understanding of the present invention, reference is made to the following description, taken in conjunction with the accompanying drawings, in which like reference characters refer to like parts throughout, and in which:

FIG. 4 shows illustrative substages involved in generating a value corresponding to earnings quality of an entity based on still another metric of accruals in accordance with the present invention;

FIG. 5 shows illustrative substages involved in generating a value corresponding to earnings quality of an entity based on yet another metric of accruals in accordance with the present invention;

FIGS. 6-12 are charts illustrating various classifications of entities according to their values corresponding to earnings quality in accordance with the present invention;

DETAILED DESCRIPTION OF THE INVENTION

Figure 1:
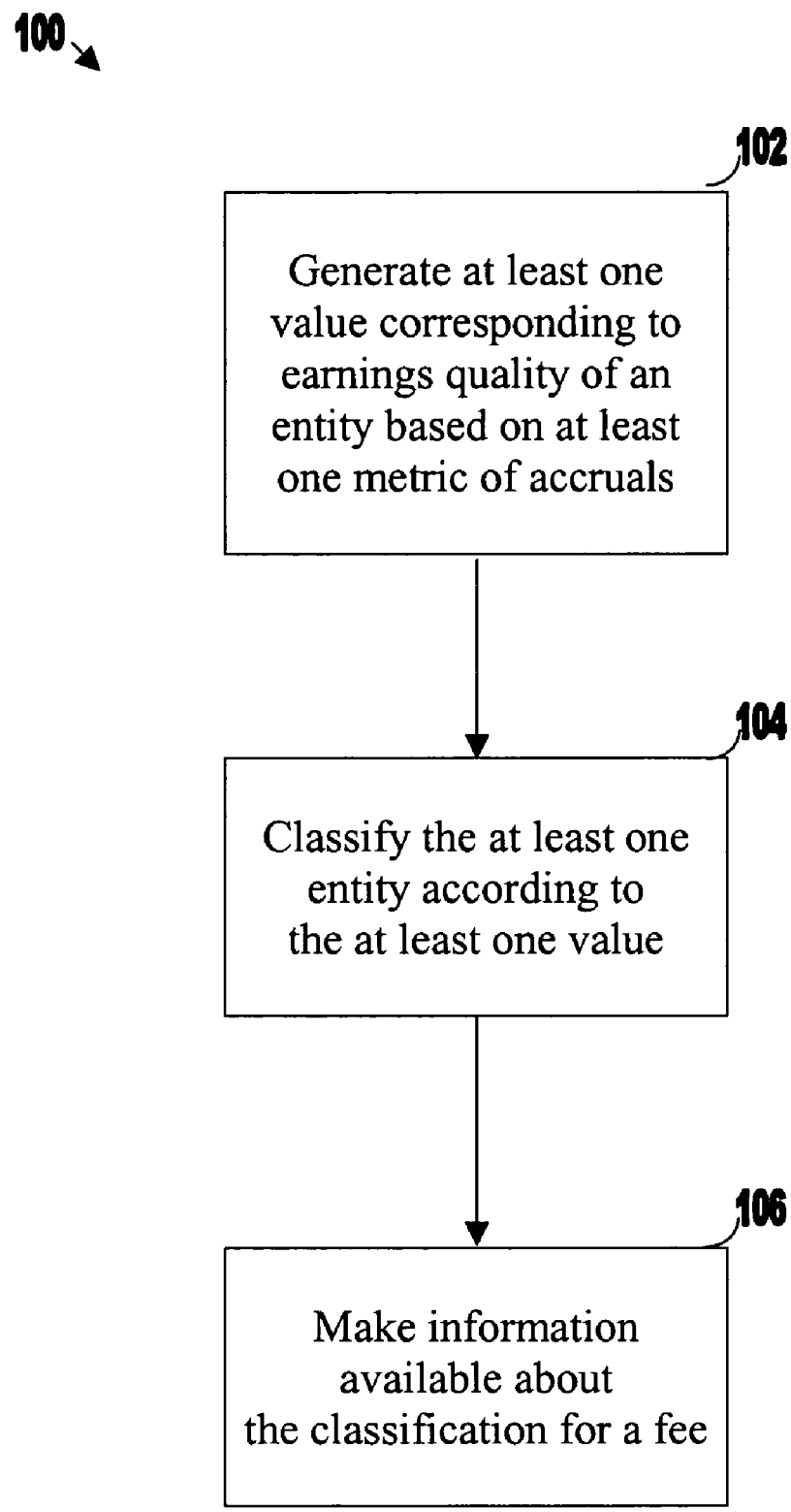
FIG. 1 is a flowchart of illustrative stages involved in classifying at least one entity according to earnings quality in accordance with the present invention.

The present invention provides methods and systems for classifying entities according to metrics of earnings quality. As used herein, an entity may include a company, a corporation, a partnership, a non-profit organization, or any other business entity. For example, an entity may include an entity included in the S&P 500, a utility company, or a financial services institution (e.g., a bank, insurance company, or real estate investment trust (REIT)). Classifying entities in accordance with the present invention may include predicting that an entity has overstated its earnings and/or predicting one or more business outcomes for the entity. Information about the classification may be made available for a fee and may allow parties to make better business and/or regulatory decisions.

Accounting provides a substantial amount of discretion to managers who prepare financial disclosures. This discretion can be used to make the financials of an entity more informative about the entity's economic performance. At the same time, this discretion can be used to hide poor economic performance, achieve certain earnings targets, avoid covenant violations, and so on. The present invention analyzes earnings components that arise from managers' estimates and result from the discretion provided in financial accounting. These estimates and discretions are accounted for by the present invention which thereby enables external parties (e.g., stockholders, insurance companies, regulatory agencies, etc.) to make better business or regulatory decisions. The entities themselves (such as management or board of directors) may also benefit from the methods and systems of the present invention, as the invention may provide these entities with an indicator of how external parties stand to perceive their respective financial disclosures. The entities may determine and/or modify the way they account for and disclose their financials based on the methods and systems of the present invention.

The nature of financial accounting is to accrue and defer past, current, and expected future cash receipts and disbursements. This may involve a significant amount of estimation of future cash receipts and payments, and a subjective allocation of past cash receipts and payments. Thus, financial accounting and more specifically the accruals process may create accounts of varying reliability. For example, recording the net realizable value of receivables involves an estimation of default risk across a portfolio of debtors. Other examples of estimations involved in the accruals process are estimating recoverable amounts of inventories, depreciating and amortizing long-lived assets, and estimating post-retirement benefit obligations.

Accruals are typically associated with a non-cash component of earnings. As described below, the present invention provides various metrics for measuring accruals. Values for these metrics may be determined for a particular business entity using, for example, data from one or more financial disclosures of the entity. Values for the accruals may be derived from the disclosures (i.e., the values may not be listed directly on the disclosures). As accruals may be estimates of future cash flows and based on subjective allocations of past cash flows, accruals typically provide substantial discretion to managers preparing financial disclosures. It is this discretion that makes accruals easy to manipulate for the purpose of earnings management. For example, in years of poor performance, entities might boost their earnings with insufficient allowances for doubtful accounts, insufficient provisions for obsolete inventory, or aggressive revenue recognition practices that bring future revenues into the current period. Other accruals manipulations might arise in response to implicit and explicit contracts and often in combination with poor performance. For example, entities close to covenant violations may resort to accruals manipulations. Similarly, managers of entities may adjust accruals in response to bonus contracts. That is, managers may use accruals to manipulate earnings downwards if they are close to the ceiling of a bonus contract and upwards if they are below a target in the bonus contract. Accruals may also be adjusted in response to capital market pressures such as, for example, earnings forecasts by financial analysts. Common to these examples is the fact that accrual manipulations inflate (or deflate) current earnings, but cash flows are unaffected. As a result, the earnings reported by an entity may overstate (or understate) the financial health of the entity.

The present invention provides methods and systems for detecting, or at least predicting the likely occurrence of, earnings manipulations by an entity. FIG. 1 is a flowchart 100 of illustrative stages involved in classifying at least one entity according to earnings quality in accordance with the present invention. At stage 102, at least one value corresponding to earnings quality of an entity is generated based on at least one metric of accruals. For example, a value corresponding to earnings quality of a single entity may be generated based on a metric of accruals. As another example, a plurality of values corresponding to earnings quality of a respective plurality of entities may be generated based on one or more metrics of accruals. Illustrative metrics of accruals and their uses in generating values corresponding to earnings quality of entities in accordance with the present invention are described below in connection with FIGS. 2-5. In some embodiments of the present invention, the value(s) may be generated using data from one or more financial disclosures. A financial disclosure may include a statement of cash flows, a balance sheet, a reported earnings disclosure, or any other financial disclosure. In some embodiments of the present invention, the value(s) may be generated using data not originating from a financial disclosure. For example, confidential data of an entity may be used to generate a value for the entity. Such a value may provide an indicator of how external parties stand to perceive the entity, should the entity decide to report the data in one or more financial disclosures.

At stage 104, an entity is classified according to a value corresponding to earnings quality. For example, when a value indicates that earnings reported by an entity contains a high accruals component, stage 104 may involve classifying the entity as likely to have overstated its earnings. Financial disclosures with high accruals components may be referred to as low quality financial disclosures. Financial disclosures with low accruals components may be referred to as high quality financial disclosures.

As another example, stage 104 may involve classifying the at least one entity as likely to experience one or more business outcomes including a change in stock prices, an SEC enforcement action, a class-action lawsuit, an earnings restatement, a change in future earnings, a change in bond spreads and bond prices, and any other future business outcome(s) or a combination thereof. Additional details regarding the correlation between various business outcomes and the values corresponding to earnings quality that are generated in accordance with the present invention are described below in connection with FIGS. 13-16.

In still another example, stage 104 may involve separating multiple entities into various classes by ranking the entities according to their respective values (e.g., separating the entities into 10 classes, where each class is referred to as a "decile"; those skilled in the art will recognize that while this example uses 10 classes, other numbers of classes can be employed without exceeding the scope of the present invention). Entities at one end of the rank may be classified as most likely to have overstated their earnings and/or as most likely to experience one or more business outcomes, whereas entities at the opposite end of the rank may be classified as least likely to have overstated their earnings and/or as least likely to experience the one or more business outcomes. Additional details regarding separating entities into classes are described below in connection with FIGS. 6-12.

At stage 106, information about the classification may be made available for a fee. For example, stage 106 may involve a party responsible for the generating and the classifying making the classification information available through a network connection such as, for example, the Internet, a private LAN or WAN, etc. The party may implement a web-server that receives and responds to requests for access to the classification information from remote devices (e.g., personal computers, kiosks, etc.). The server may provide access only to remote devices associated with clients who have paid or have contracted to pay the fee or it could provide a "pay as you go" service. Access may be granted over a predetermined period of time (e.g., a month or year or some other definite period of time) based on a subscription fee, on a per-use basis by charging a fee for each use (e.g., the fee determined based on the number of entities for which information is requested), or in any other suitable arrangement. Additional details regarding an illustrative system for classifying entities in accordance with the present invention are described below in connection with FIG. 17.

In another example, stage 106 may involve the party responsible for the generating and the classifying "pushing" (e.g., electronically) information regarding the classification to one or more parties who have paid for such service. For example, the party may e-mail the classification information to a client, or may send the classification information to the client through physical mail (e.g., via Express Mail) or via some other available method.

Still another example, stage 106 may involve encoding a computer-readable medium (e.g., CD-ROM, DVD, computer disk or any other suitable memory device) with the classification information of the present invention and/or computer-executable instructions for performing stages 102 and 104 of flowchart 100 or other stages related to classifying entities, and offering the medium for sale to consumers. By classifying entities according to earnings quality and making the classification information available to others, the occurrence of uninformed business and regulatory decisions may be reduced. Proverbial "red flags" are raised indicating that various entities may have manipulated their earnings and/or that the entities may be likely to experience various business outcomes. This alerts users of the invention that further analysis of these entities may be required before decisions relating to the entities are made.

Figure 2:
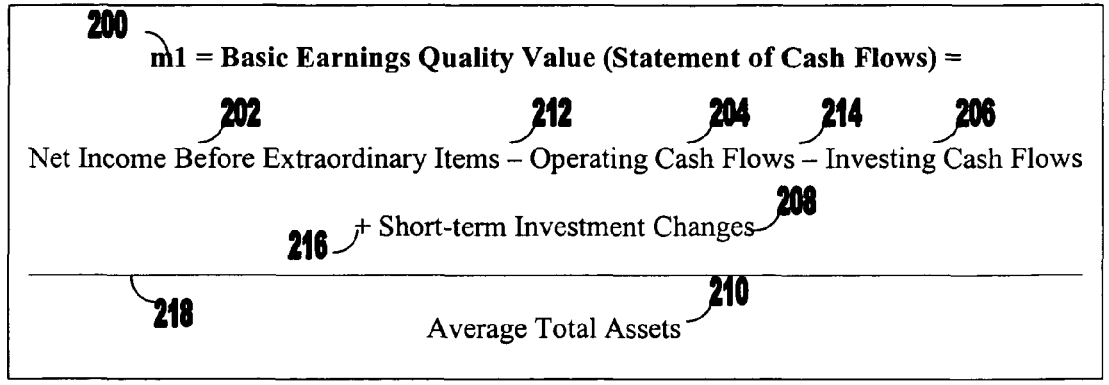
FIG. 2 shows illustrative substages involved in generating a value corresponding to earnings quality of an entity based on a metric of accruals in accordance with the present invention.

FIG. 2 shows illustrative substages involved in generating a value corresponding to earnings quality of an entity in accordance with an embodiment of the present invention. In particular, FIG. 2 shows an equation 200 for a metric of accruals (m1) that can be used to determine a "basic earnings quality value" for an entity. The value may be generated using data from a statement of cash flows or other financial disclosure(s) having the requisite information. For example, equation 200 may be used to generate values for entities included in the S&P 500. It will be appreciated that terms 202, 204, 206, 208 and 210 in equation 200 may correspond to various substages of stage 102 (FIG. 1). In particular, term 202 may correspond to the substage of determining net income before extraordinary items for the entity. Term 204 may correspond to the substage of determining operating cash flows for the entity. Term 206 may correspond to the substage of determining investing cash flows for the entity. Term 208 may correspond to the substage of determining short-term investment changes for the entity. Term 210 may correspond to the substage of determining average total assets for the entity. In some embodiments of the present invention, these "determining" substages may involve retrieving financial information from one or more databases. For example, the determining may involve retrieving one or more of data items 123, 308, 311, and 6 for the entity from the S&P Computstat database. These items may correspond respectively to terms 202, 204, 206, and 210 in equation 200. As another example, the determining may involve retrieving data item 309 (for yearly information) or item 109 (for quarterly information) from the S&P Computstat database for information for term 208. When the database does not include information for items 309 and/or 109, term 208 may be set to zero. Mathematical operators 212, 214, 216, and 218 in equation 200 may also correspond to various substages of stage 102. For example, mathematical operator 210 may represent the substage of subtracting operating cash flows (e.g., item 308) from net income before extraordinary items (e.g., item 123). Substages 202-218 are only illustrative. Any other way of generating a value corresponding to earnings quality for the entity based on the metric set forth by equation 200 may be provided in accordance with the present invention (e.g., determining terms 204 and 206 in a single substage when an aggregate value of operating cash flows and investing cash flows is available for the entity).

Metric m1 of equation 200 provides a measure of "total accruals" for an entity. When term 206 is not included in equation 200, the metric provides a measure of "operating accruals." Analysis shows that total accruals provides a better indicator of earnings manipulations and business outcomes than operating accruals alone. Accordingly, in a preferred embodiment, the present invention classifies entities according to at least one metric of total accruals. However, those skilled in the art will recognize that entities may be classified according to one or more metrics of operating accruals or other accruals and still fall within the scope of the invention.

Figure 3:
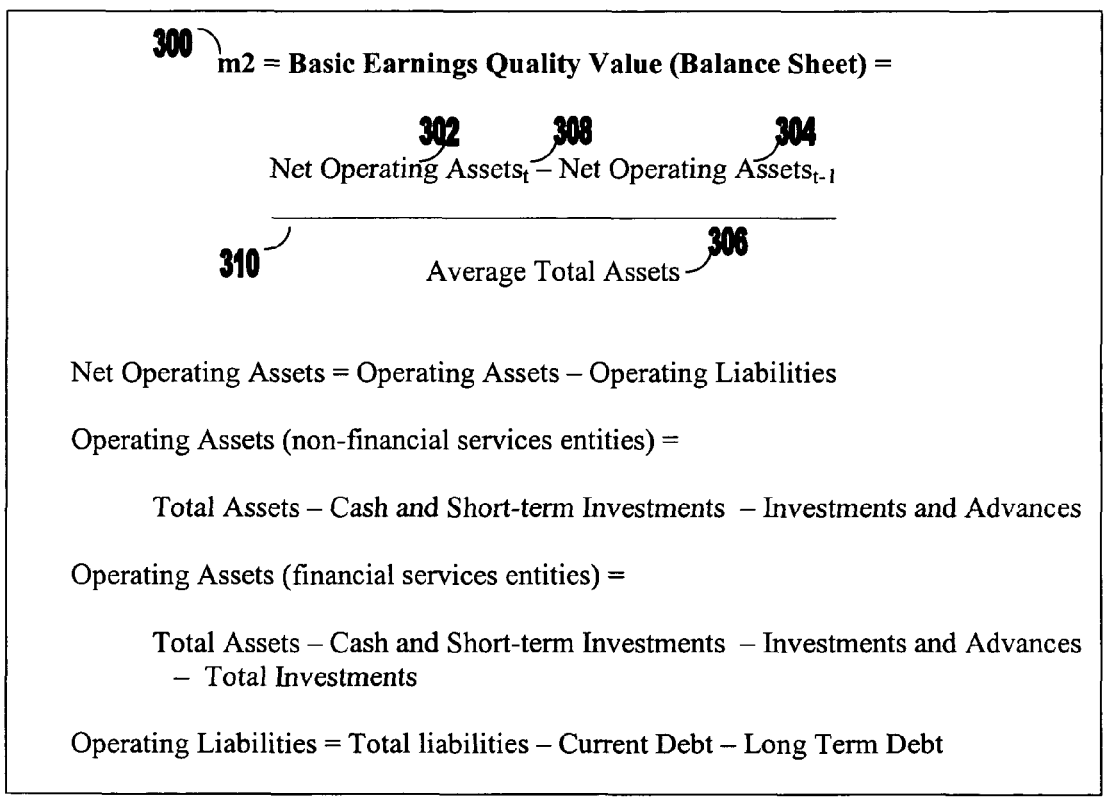
FIG. 3 shows illustrative substages involved in generating a value corresponding to earnings quality of an entity based on another metric of accruals in accordance with the present invention.

FIG. 3 shows illustrative substages involved in generating a value corresponding to earnings quality of an entity in accordance with another embodiment of the present invention. FIG. 3 shows an equation 300 for a metric of total accruals (m2) that can be used to determine a "basic earnings quality value" for an entity. Accruals metric m2 may be used for entities such as financial services entities that typically do not report the data required by metric m1 (e.g., banks, insurance companies, and real estate investment trusts (REIT)). A value for m2 may be generated using data from a balance sheet or other financial disclosure(s) having the requisite information.

Equation 300 for metric m2 measures a change, over a predetermined unit of time, in net operating assets of an entity. It will be appreciated that equation 300 may be modified to provide a metric of operating accruals by measuring a net change in working capital instead of operating assets. The predetermined unit of time may include a month, a quarter, a year or other unit of time. The measured change may then be divided by average total assets in order to adjust for entity size. As shown in FIG. 1, metric m1 may make the same adjustment. Such an adjustment may facilitate the comparison (e.g., placement into relative classes) of entities of different sizes that may or may not experience changes in size during a given time period. It will be appreciated that terms 302, 304, and 306 and mathematical operators 308 and 310 in equation 300 may correspond to various substages of stage 102 (FIG. 1). For example, term 302 may correspond to the substages of determining operating assets for the entity at a given time t, determining operating liabilities for the entity at the given time t, and subtracting the latter from the former. Term 304 may correspond to the substages of determining operating assets for the entity at a given time t−1, determining operating liabilities for the entity at the given time t−1, and subtracting the latter from the former. Illustrative substages involved in determining operating assets and operating liabilities are also shown in FIG. 3. For example, for non-financial services institutions, determining operating assets may involve subtracting investments and advances (e.g., Computstat data item 32) and cash and short-term investments from total assets. Because information for investments and advances is typically only available on a yearly basis, this term may be set to zero during other quarters. For financial services institutions, total investments (e.g., from the SNL database) may additionally be subtracted from total assets. Total investments may be determined by adding the sub-items of trading account securities, securities available for sale, and securities held to maturities. Thus, the "determining" substages associated with metric m2 may involve retrieving financial information from one or more databases such as, for example, from both the SNL database and the S&P Computstat database when earnings quality values are generated for financial services institutions.

The following example illustrates generating values corresponding to earnings quality for a company based on metrics m1 and m2. First addressing m1, when the company reports (e.g., in a statement of cash flows) net income before extraordinary items of $441,771, operating cash flows of $874,119, −$1,319,542 in investing cash flows, $4,040,226 in total assets for a given time (e.g., 2002), and $5,820,134 in total assets for a subsequent time (e.g., 2003), where all amounts are in thousands, metric m1 produces a value of 0.179952 for the company. In this example, average total assets is calculated as the average of the total assets for the two times. Next addressing m2, when the same company reports (e.g., in a balance sheet from which the values can be derived or other disclosure in which the values are reported directly) net operating assets for a given time (e.g., 2002) of $2,463,926 and net operating assets for a subsequent time (e.g., 2003) of $3,642,045, where all amounts are in thousands, metric m2 produces a value of 0.23896 for the company. The same value of average total assets used to calculate m1 was used to calculate the value for m2. Thus, it can be seen that metrics m1 and m2 may provide similar (and in some instances, the same) values corresponding to earnings quality. As described in greater detail below, this allows for an "apples to apples" comparison between values from the two metrics.

FIG. 4 shows illustrative substages involved in generating a value corresponding to earnings quality of an entity in accordance with a third embodiment of the present invention. In particular, FIG. 4 shows an equation 400 for a metric of accruals (m3) that adjusts a basic earnings quality value of an entity (e.g., a value based on metric m1 or m2) based on the industry of that entity. Analysis shows that the level of accruals of an entity largely depends on the entity's business process and that these processes may vary significantly across industries. For example, an entity that receives payments for services before the services are rendered is likely to have a different level of accruals than an entity whose products are sold cash and carry. Thus, adjusting the basic earnings quality values of m1 and m2 (for example) for differences across industries provides an additional level of intelligence that separates instances where accruals are high for operating reasons from instances where accruals are high because of manipulations. In that situation, entities with accruals manipulations may require further examination.

Metric m3 is particularly useful for comparisons of entities across different industries (e.g., comparing all firms included in the S&P 500 adjusted by their respective industries). When entities from only the same industry are compared, the basic values from metrics m1 and m2 may be sufficient. It will be appreciated that terms 402 and 404 and mathematical operator 406 in equation 400 may correspond to various substages of stage 102 (FIG. 1). In particular, term 402 may correspond to the substage of determining a basic earnings quality value for an entity (e.g., determining a value for metric m1 or m2). Term 404 may correspond to the substage of determining and averaging the basic values of other entities in the same industry. Mathematical operator 406 may correspond to the substage of subtracting the latter from the former. Whether entities are considered to be part of the same industry can be based on various industry indicators, such as two-digit SIC codes that associate entities with industries. Substages 402-406 are only illustrative. Any other way of generating an industry-adjusted value corresponding to an earnings quality of an entity may be provided in accordance with the present invention.

FIG. 5 shows illustrative substages involved in generating a value corresponding to earnings quality of an entity in accordance with an embodiment of the present invention. FIG. 5 shows an equation 500 for a metric of accruals (m4) that adjusts a basic earnings quality value of an entity (e.g., a value based on metric m1 or m2) based on the performance level of the entity. Analysis shows that higher levels of accruals naturally occur for entities that are growing because these entities have growing receivables, inventories, and other working capital, all of which are non-cash items. Thus, higher levels of accruals are not a major concern for these entities. Conversely, poorly performing entities are more likely to liquidate inventories and reduce working capital. Therefore, one would expect to observe relatively lower levels of accruals for poorly performing entities. If instead the magnitude of accruals is relatively high for such entities, this is a warning sign of accruals manipulations. Accordingly, adjusting the basic earnings quality values of m1 and m2 (for example) for differences in performance provides an additional level of intelligence that separates instances where high accruals are less of a concern from instances where accruals are high because of manipulations. In such instances, entities who are likely to have manipulated accruals may require further examination.

Terms 502 and 504 and mathematical operator 506 in equation 500 for metric m4 may correspond to various substages of stage 102 (FIG. 1). In particular, term 502 may correspond to the substage of determining a basic earnings quality value for an entity (e.g., determining a value for metric m1 or m2). Term 504 may correspond to the substage of determining and averaging the basic values of other entities in the same performance class (e.g., decile). As shown in FIG. 5, whether entities are considered to be in the same performance class may be determined based on the entities' measures of returns on assets (ROA). For example, entities with the highest top 10% of ROA may be considered to be in the same performance class. A return on assets may be determined for an entity by determining the entity's operating income (e.g., Compustat data item 178) and dividing that value by the entity's average total assets (e.g., Compustat data item 6). The substages of FIG. 5 are only illustrative. Any other way of generating a performance-adjusted value corresponding to earnings quality of an entity may be provided in accordance with the present invention.

A basic earnings quality value of an entity may be performance-adjusted in an industry context (e.g., adjusting the basic value of a health-care entity by determining and averaging the basic values of other health-care entities in the same performance class and subtracting this average from the basic value of the entity). Essentially, this combines both the performance and industry adjustments into a single metric which may provide a very sophisticated measure of earnings quality.

At least one of the above-described metrics or other metrics corresponding to earnings quality may be used to separate entities into classes (e.g., deciles) by ranking the entities according to their respective values of accruals. The entities included in a rank may include any suitable universe of entities such as all entities in the S&P 500 or Russell 2000, entities within one or more industries (e.g., telecommunications, health care), or other groups of entities (e.g., all entities in a given party's portfolio). Entities with the largest accruals may be at one end of the rankings (e.g., within the first one or more deciles), which may indicate that the entities are likely to have overstated their earnings. Thus, these entities may be candidates for further examination such as contextual analysis by an analyst. Entities at the opposite end of the rankings (e.g., in the lowest decile) may also warrant further inspection because low or even negative values of accruals may provide an indication of earnings manipulations as well. For example, such entities might be overstating allowances for doubtful accounts and/or restructuring charges to create "cookie jar reserves" for the future. In other words, the entities may understate present earnings so that they can overstate earnings in the event of poor economic performance in the future.

In some embodiments of the present invention, entities may be separated into classes based on a single metric of accruals (e.g., m1 or m2). In some embodiments of the present invention, multiple metrics of accruals may be used to rank the entities. For example, each entity in the ranking may be classified according to an average of the m1 and m2 values for that entity. This average may or may not be performance and/or industry adjusted (e.g., FIGS. 4 and 5). As another example, some entities (e.g., entities listed in the S&P 500) in a given ranking may be classified based on their values for a first metric (e.g., m1), whereas other entities (e.g., financial services firms) in the ranking may be classified based on their values for a second metric (e.g., m2). This is because metrics m1 and m2 may often produce the same or similar values for an entity and therefore provide an "apples to apples" comparison.

FIGS. 6-12 are charts illustrating various entity classifications in accordance with the present invention. FIGS. 6-12 may illustrate the appearance of various web pages that are displayed to users of the present invention when, for example, a web server provides remote devices with access to information regarding the entity classifications over the Internet for a fee. In another example, FIGS. 6-12 may illustrate the content of electronic files that are "pushed" (e.g., e-mailed) to remote devices associated with clients who have paid a fee. Still another example, FIGS. 6-12 may illustrate the output generated by a computer by reading a computer-readable medium (e.g., CD-ROM, DVD, computer disk or any other suitable memory device) encoded with information about entity classifications and/or computer-executable instructions for performing stages 102 and 104 of flowchart 100 (FIG. 1) or other stages related to entity classification.

FIG. 6 is a chart illustrating a classification of entities according to their values corresponding to earnings quality in accordance with the present invention. In particular, the classification of chart of FIG. 6 is based on a ranking of all non-financial entities covered by the S&P Compustat database for the period of 1998-2001. In other examples, any other suitable observation period may be used (e.g., a most current quarter, quarter(s), or year). The entities are ranked according to their respective values for a metric of operating accruals (i.e., equation 200 of FIG. 2 without terms 206 and 208 in this example) and separated into ten classes (i.e., deciles). Entities having values of operating accruals within the lowest 10% are included in class 1, entities having values of operating accruals within the highest top 10% are included in class 10, and so on. As shown, the lower bound for class 10 is a value of 0.76, which provides a useful heuristic to assess earnings quality. For example, based on the information from FIG. 6, an insurance company or other party may classify entities (i.e., including entities which may or may not be included in the ranking of chart 600) with values of operating accruals greater than or equal to 0.76 as most likely to have overstated its earnings and/or to experience one or more business outcomes. As another example, an entity may determine how to report its financial data in such a way that assures its value is less than about 0.76 based on the information from chart 600. The chart of FIG. 6 also shows that entities with values less than or equal to −0.247 may be most likely to have understated their earnings.

FIGS. 7-12 are charts illustrating entity classifications for various industry groups in accordance with the present invention. Classifying entities in the same industry may advantageously indicate whether given levels of accruals should be attributed to earnings manipulations or to the particular business process(es) associated with the industry. Entities having levels of accruals attributable to earnings manipulations may require further examination. FIG. 7 is a chart illustrating a classification of entities in the automobile and truck industry according to their values of operating accruals (e.g., equation 200 of FIG. 2 without term 206 in this example) in accordance with the present invention. Such a classification may involve the substages of stages 102 and 104 (FIG. 1) of determining all entities having at least one of the 4-digit SIC classification codes of 2296, 2396, 3010-3011, 3537, 3647, 3694, 3700-3716, 3790-3792, and 3799 or other codes for the automobiles and trucks industry, determining values corresponding to earnings quality for these entities, and ranking the entities according to the values. As shown, any entity in the automobiles and trucks industry having a value of operating accruals greater than or equal to 0.01 may be most likely to have overstated its earnings and/or to experience one or more business outcomes. This indicates that entities in the automobiles and trucks industry generally report lower levels of operating accruals than, for example, the accruals reported by the entities included in the S&P Compustat database (FIG. 6). To the contrary, entities with values less than or equal to −0.345 may be most likely to have understated their earnings.

FIG. 8 is a chart illustrating a classification of entities in the healthcare industry according to their respective values of operating accruals in accordance with the present invention. Such a classification may involve the substages of stages 102 and 104 (FIG. 1) of determining all entities having at least one of the 4-digit SIC classification codes of 8000-8099 or other codes of the healthcare industry, determining values corresponding to earnings quality for these entities, and ranking the entities according to the values. As shown, any entity in the healthcare industry having a value of operating accruals greater than or equal to 0.022 may be most likely to have overstated its earnings and/or to experience one or more business outcomes. To the contrary, entities with values less than or equal to −0.462 may be most likely to have understated their earnings.

FIG. 9 is a chart illustrating a classification of entities in the medical equipment industry according to their respective values of operating accruals in accordance with the present invention. Such a classification may involve the substages of stages 102 and 104 (FIG. 1) of determining all entities having at least one of the 4-digit SIC classification codes of 3693 and 3840-3851 or other codes of the medical equipment industry, determining values corresponding to earnings quality for these entities, and ranking the entities according to the values. As shown, any entity in the medical equipment industry having a value of operating accruals greater than or equal to 0.079 may be most likely to have overstated its earnings and/or to experience one or more business outcomes. To the contrary, entities with values less than or equal to −0.272 may be most likely to have understated their earnings.

FIG. 10 is a chart illustrating a classification of entities in the pharmaceutical products industry according to their respective values of operating accruals in accordance with the present invention. Such a classification may involve the substages of stages 102 and 104 (FIG. 1) of determining all entities having at least one of the 4-digit SIC classification codes of 2830-2836 or other codes of the pharmaceutical products industry, determining values corresponding to earnings quality for these entities, and ranking the entities according to the values. As shown, any entity in the pharmaceutical products industry having a value of operating accruals greater than or equal to 0.027 may be most likely to have overstated its earnings and/or to experience one or more business outcomes. To the contrary, entities with values less than or equal to −0.440 may be most likely to have understated their earnings.

FIG. 11 is a chart illustrating a classification of entities in the telecommunications industry according to their respective values of operating accruals in accordance with the present invention. Such a classification may involve the substages of stages 102 and 104 (FIG. 1) of determining all entities having at least one of the 4-digit SIC classification codes of 4800-4899 or other codes of the telecommunications industry, determining values corresponding to earnings quality for these entities, and ranking the entities according to the values. In this example, any entity in the telecommunications industry having a value of operating accruals greater than or equal to −0.023 may be most likely to have overstated its earnings and/or to experience one or more business outcomes. On the contrary, entities with values less than or equal to −0.821 may be most likely to have understated their earnings.

FIG. 12 is a chart illustrating a classification of entities in the utilities industry according to their respective values of operating accruals in accordance with the present invention. Such a classification may involve the substages of stages 102 and 104 (FIG. 1) of determining all entities having at least one of the 4-digit SIC classification codes of 4900-4999 or other codes of the utilities industry, determining values corresponding to earnings quality for these entities, and ranking the entities according to the values. As shown, any entity in the utilities industry having a value of operating accruals greater than or equal to 0.043 may be most likely to have overstated its earnings and/or to experience one or more business outcomes. To the contrary, entities with values less than or equal to −0.127 may be most likely to have understated their earnings.

Figure 13:
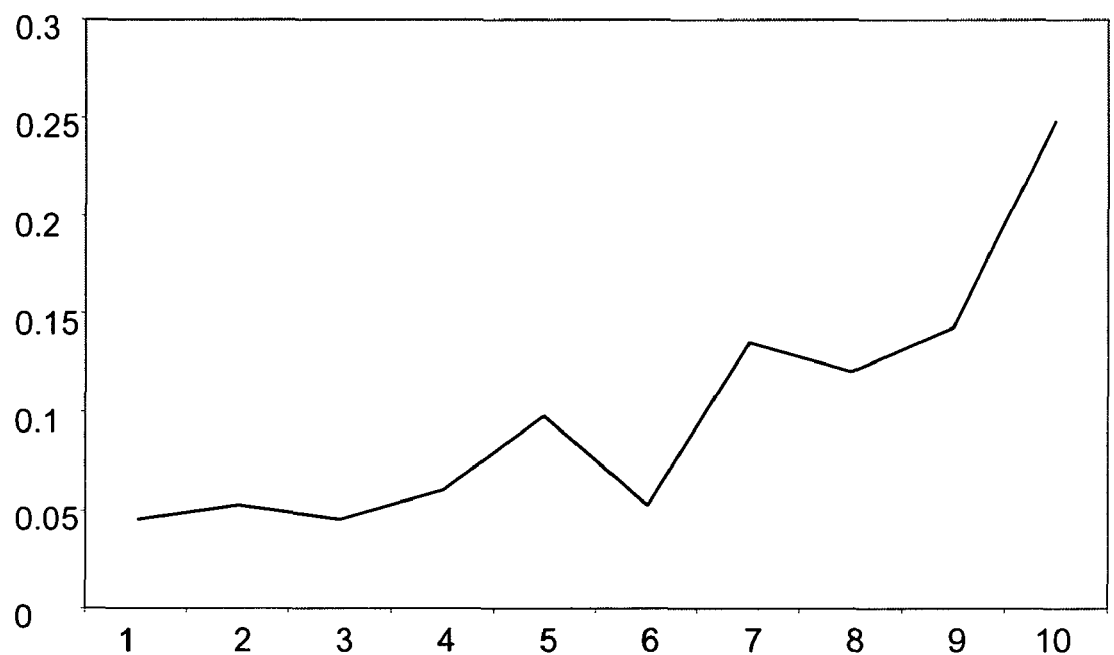
FIGS. 13-16 are graphs illustrating various correlations between values corresponding to earnings quality and business outcomes in accordance with the present invention.
Figure 14:
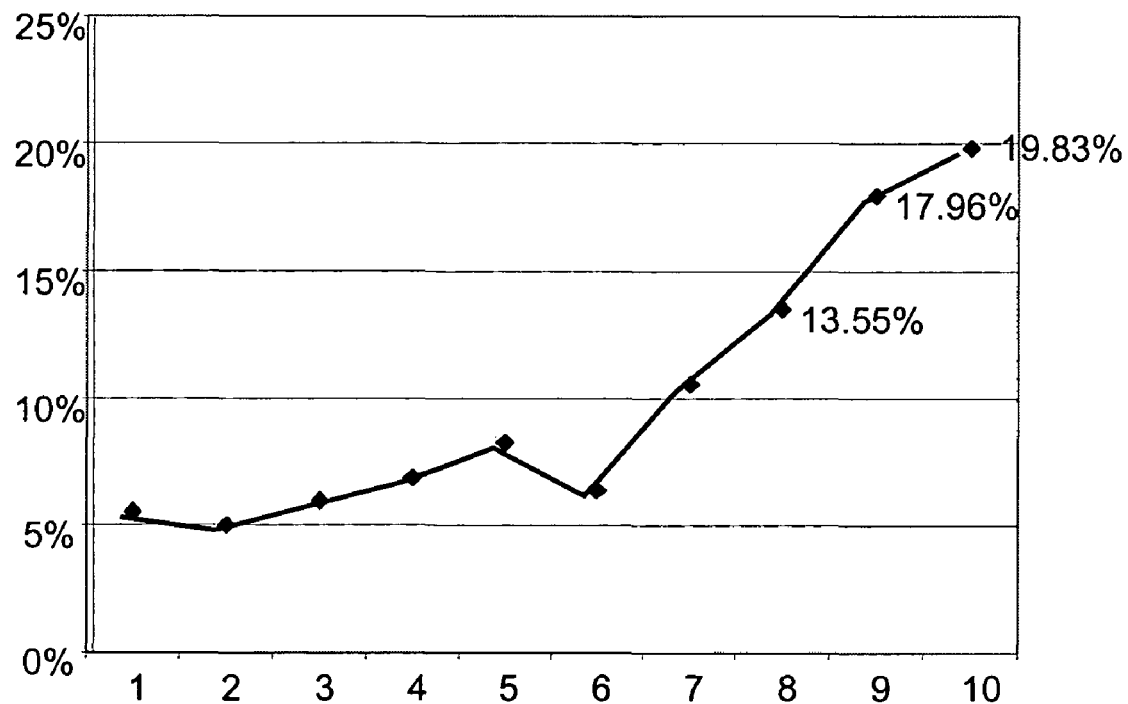
Figure 15:
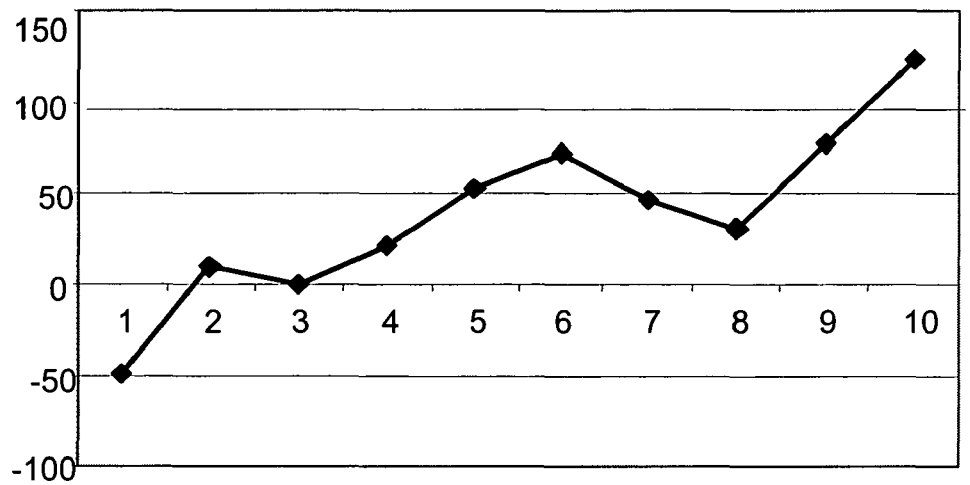

The values corresponding to earnings quality of the present invention have been determined to be predictive of various business outcomes. FIGS. 13-16 are graphs illustrating various correlations between values corresponding to earnings quality and business outcomes including SEC enforcement actions, class-action lawsuits, and changes in bond spreads and bond prices in accordance with the present invention. Similar correlations have been determined between the values of the present invention and the business outcomes of earnings restatements and future earnings levels. As with FIGS. 6-12, FIGS. 13-15 (and other graphs illustrating correlations between accruals levels and business outcomes) may illustrate the appearance of various web pages accessed by remote devices for a requisite fee. FIGS. 13-15 may also illustrate the content of electronic files that are "pushed" (e.g., by e-mail) to remote devices for a fee. In another example, FIGS. 13-15 may illustrate the output generated by a computer by reading a computer-readable medium encoded with classification information and/or executable instructions for performing stages 102 and 104 of flowchart 100 (FIG. 1) or other stages related to entity classification, subsequent to a purchase of the medium by a consumer.

FIG. 13 is a graph illustrating a correlation between total accruals and SEC enforcement actions in accordance with the present invention. In particular, from a sample of 133 SEC enforcement actions, FIG. 13 shows a strong positive correlation between accruals levels and an enforcement action. For example, 25% of the occurrences of SEC enforcement actions were experienced by entities within the highest accrual decile (i.e., class 10). That is a much higher correlation than what would be expected if there was no link between accruals levels and SEC enforcement actions.

FIG. 14 is a graph illustrating a correlation between total accruals and class-action lawsuits in accordance with the present invention. The data used to generate graph 1400 included all 1221 class actions that occurred between 1996 and 2003 as reported by the Stanford University Law School in cooperation with Cornerstone Research. However, some class actions were eliminated such as class actions against small companies without readily available balance sheet information, all non-accounting and duplicate class actions, all class actions against companies that were delisted or acquired before their class start dates, and all class actions for private and financial companies, to arrive at a universe of 683 class actions. As shown, 38% of all the class actions were experienced by entities within the two highest accruals deciles (i.e., deciles 9 and 10) and 51% by entities within the three highest deciles. In accordance with the present invention, accruals levels have also been determined to correlate with non-accounting related class-action lawsuits such as, for example, products liability class-action lawsuits. Likely causes for this correlation are that managers of entities may overzealously rush products (e.g., services and articles of manufacture) to the market in response to bonus contracts and/or to boost financials of poorly performing entities.

Figure 16:
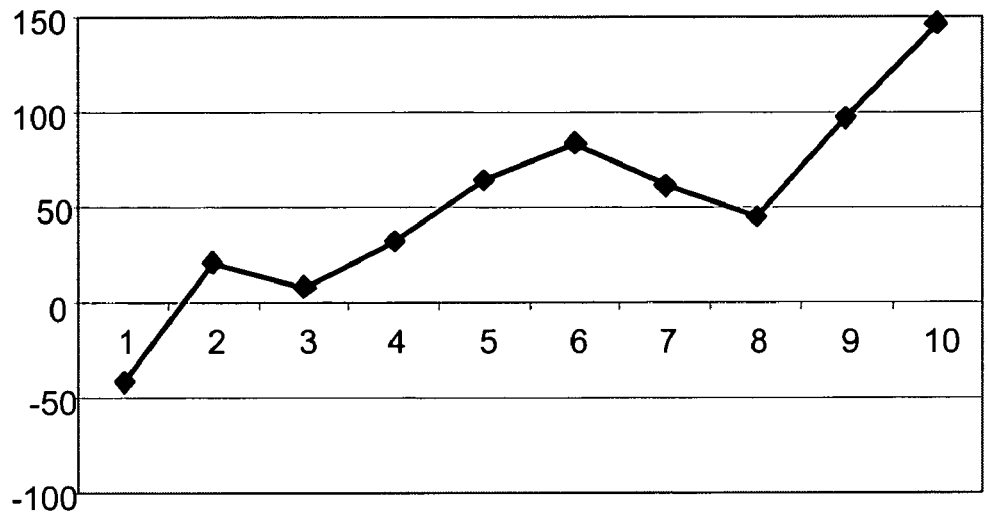

FIGS. 15 and 16 are graphs illustrating correlations between total accruals and changes in bond spreads in accordance with the present invention. In particular, FIGS. 15 and 16 illustrate correlations between total accruals and forward changes in option-adjusted-spreads (OAS) of high-yield bonds. FIGS. 15 and 16 show that accruals and changes in bond spreads are correlated regardless of whether adjustments are made to control for rating and duration differentials among the high-yield bonds, although the results that adjust for rating and duration may be more meaningful. Thus, being aware of accruals levels of entities may be useful in the selection process of high-yield bonds.

Figure 17:
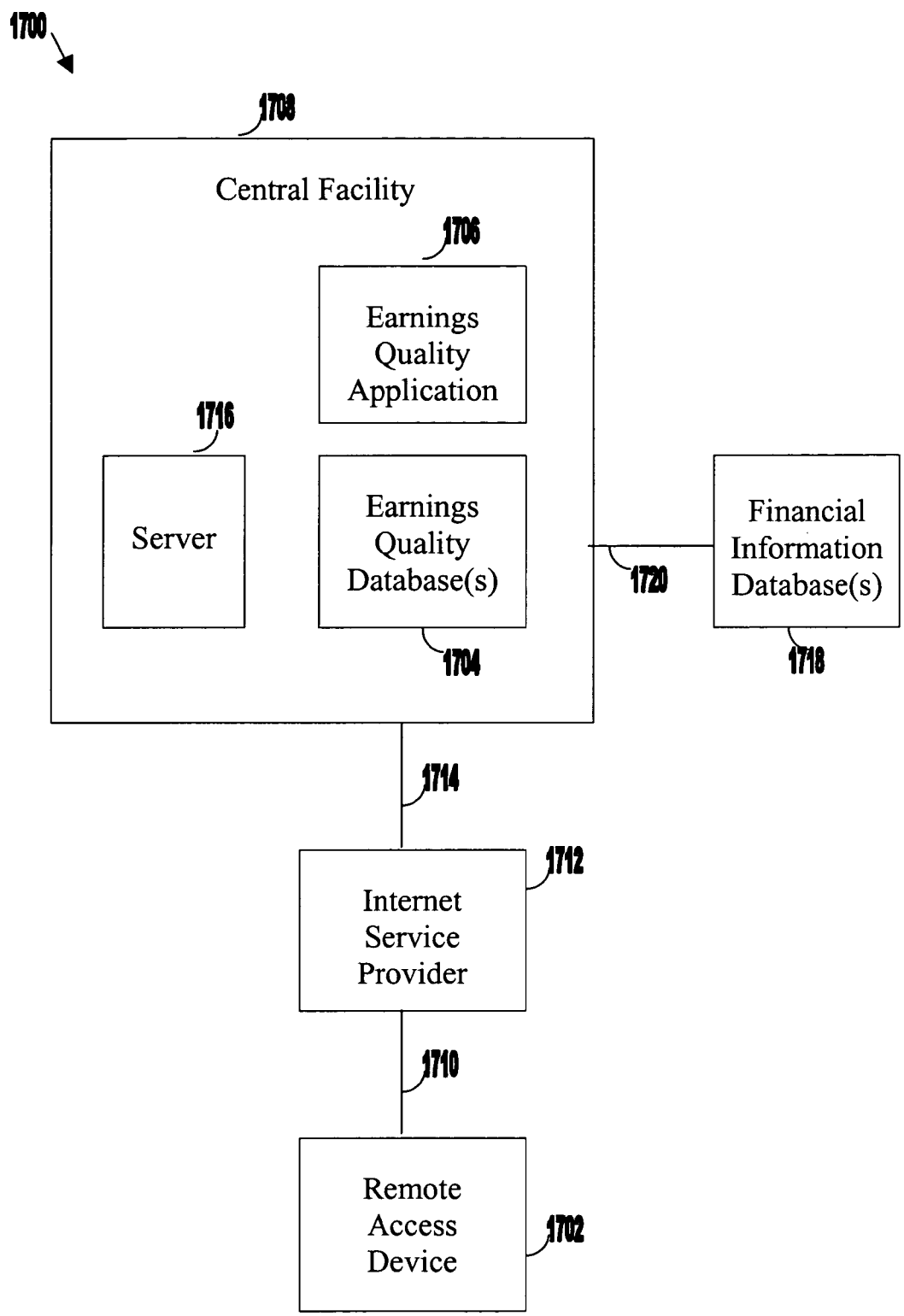
FIG. 17 is a block diagram of a system in accordance with the present invention.

FIG. 17 is a block diagram of an illustrative system 1700 in accordance with the present invention. In one embodiment, remote access device 1702 may request access to earnings quality database(s) 1704 and/or earnings quality application 1706 from central facility 1708 via communications link 1710, Internet Service Provider (ISP) 1712, and communications network 1714. Central facility 1708 may include server 1716 for receiving and processing the request from remote access device 1702. Server 1716 may provide remote device 1702 with access only when a client associated with the device has paid or has contracted to pay a requisite access fee. Clients who have paid or contracted to pay the access fee (e.g., via a secure online payment system) may be assigned a username and password for entry into a login page, and server 1716 may provide access to a client in response to a successful login. For example, remote device 1702 may request access to one or more web pages that include earnings quality information for at least one entity (e.g., FIGS. 6-16). As another example, remote device 1702 may request access to accruals application 1706 which may be capable of generating values corresponding to earnings quality. Application 1706 may generate the values using, for example, confidential information uploaded to central facility 1708 by a client. The confidentiality of the information may be maintained by creating a separate workspace for the client at central facility 1708. Central facility 1708 may also be protected by a firewall and/or other security measures.

In another embodiment of the present invention, central facility 1708 may electronically "push" classification information to clients who have paid or have contracted to pay an access fee. For example, central facility 1708 may e-mail "canned" information associated with earnings quality values for entities to an e-mail address associated with the client. The canned information may include, for example, classification information for all entities included in the S&P 500 or all entities in a given industry. The client may then retrieve the e-mail(s) using remote access device 1702. As another example, central facility 1708 may electronically push only classification information for entities associated with the client's account to a remote device 1702. The client may, for example, use one or more web pages or other interfaces to associate entities with the client's account (e.g., one or more entities currently held in the client's portfolio and/or one or more entities that the client wishes to monitor). Central facility 1708 may push the classification information to remote access device 1702 with any suitable frequency such as, for example, quarterly, yearly or whenever the classification is changed or updated (e.g., changed or updated in response to at least one entity disseminating a new financial disclosure).

Remote access device 1702 may be any remote device capable of using browser 1716 to request access from central facility 1708 such as, for example, a personal computer, a wireless device such as a laptop computer, a cell phone or a personal digital assistant (PDA), a computer terminal at a kiosk or a hotel business center, or any other suitable remote access device having a browser implemented thereon. Multiple remote access devices 1702 may be included in system 1700 (e.g., to allow a plurality of users at a corresponding plurality of remote access devices to access financial information from central facility 1708), although only one remote access device 1702 has been included in FIG. 17 to avoid over-complicating the drawing.

Server 1716 may include a distinct component of computing hardware or storage for receiving and processing requests from remote access device 1702, but may also be a software application or a combination of hardware and software. Server 1716 may be implemented using one or more computers. For example, a single computer may have software that enables the computer to perform the functions of server 1716. As another example, server 1716 may be implemented using multiple computers.

Earnings quality application 1706 may be any suitable software, hardware, or combination thereof for generating values corresponding to earnings quality in accordance with the present invention. Earnings quality application 1706 may include, for example, software for performing stages 102 and 104 of flowchart 100 (FIG. 1) and/or other stages related to entity classification (e.g., generating the charts and graphs of FIGS. 6-16). Data for generating accruals values may be retrieved by application 1706 from one or more financial information databases 1718 over communications link(s) 1720. For example, data for generating accruals values for financial services firms may be retrieved from both the SNL database and the S&P Compustat database. Values corresponding to earnings quality and other classification information generated by application 1706 may be stored in database(s) 1704 (e.g., for access by remote access device 1702).

Earnings quality application 1706 and server 1716 are shown in FIG. 17 as being implemented at central facility 1708. However, in some embodiments of the present invention, earnings quality application 1706 and server 1716 may be implemented at separate facilities and/or in a distributed arrangement. For example, application 1706 may be at least partially implemented at remote access device 1702.

Each of communications link 1710 and 1720 and communications network 1714 may be any suitable wired or wireless communications path or combination of paths such as, for example, a local area network, wide area network, telephone network, cable television network, intranet, or Internet. Some suitable wireless communications networks may be a global system for mobile communications (GSM) network, a time-division multiple access (TDMA) network, a code-division multiple access (CDMA) network, a Bluetooth network, or any other suitable wireless network.

In accordance with another embodiment of the present invention, a computer-readable medium (e.g., CD-ROM, DVD, computer disk or any other suitable memory device) may be encoded with information about earnings quality values (e.g., information from database 1704) and/or computer-executable instructions for performing the functions of earnings quality application 1706 (e.g., stages 102 and 104 of FIG. 1), and the medium may be offered for sale to consumers.

Thus it is seen that methods and systems are provided for classifying entities according to metrics of earnings quality. One skilled in the art will appreciate that the invention can be practiced by other than the described embodiments, which are presented for purposes of illustration and not of limitation, and the present invention is limited only by the claims which follow.

We claim:

1. A computer implemented method for qualifying an earnings quality of an entity, the method comprising:
   receiving financial information for a plurality of entities;
   generating, using a programmed computer, at least one value for one of the plurality of entities, wherein the at least one value corresponds to the earnings quality of the entity, wherein the value is based on a metric of accruals, and quantifies discretionary, non-cash components of earnings for the entity;
   classifying, using a programmed computer, the entity according to the generated values by dividing the distribution of values into groups of related entities to provide an indicator of earnings quality for the entity relative to the related entities, wherein the earnings quality is indicative of future earnings performance, relative returns performance, the likelihood of a future earnings restatement, regulatory enforcement action, or legal enforcement action; and
   making available, in electronic form, information about the classification for a fee.

2. The method of claim 1, wherein said generating comprises generating at least one value based on a plurality of metrics of accruals.

3. The method of claim 1, wherein said generating comprises generating at least one value based on a metric of total accruals.

4. The method of claim 3, wherein said generating at least one value based on a metric of total accruals comprises determining a measure of net income before extraordinary items for the entity, less operating cash flows for the entity, less investing cash flows for the entity, and plus short-term investment changes.

5. The method of claim 4, wherein said generating at least one value based on a metric of total accruals further comprises dividing the measure by average total assets for the entity.

6. The method of claim 3, wherein said generating at least one value based on a metric of total accruals comprises determining a net change in operating assets for the entity.

7. The method of claim 1, wherein said generating comprises generating at least one value based on a metric of operating accruals.

8. The method of claim 7, wherein said generating at least one value based on a metric of operating accruals comprises determining a measure of net income before extraordinary items for the entity less operating cash flows for the entity.

9. The method of claim 7, wherein said generating at least one value based on a metric of operating accruals comprises determining a net change in working capital for the entity.

10. The method of claim 1, wherein said classifying comprises classifying the entity as likely to have overstated its earnings, as likely to have understated its earnings, as likely to experience a class-action lawsuit, as likely to experience a change in bond spreads, as likely to experience an earnings restatement, as likely to experience an SEC enforcement action, as likely to experience a change in future earnings, as likely to experience a change in stock prices, or a combination thereof.

11. The method of claim 1, wherein said generating comprises generating a plurality of values for a corresponding plurality of entities and wherein said classifying comprises:
ranking the entities according their respective values; and
separating the entities into classes based on the rank.

12. The method of claim 11, wherein said separating the entities into classes comprises separating the entities into deciles.

13. The method of claim 1, wherein said making information available about the classification for a fee comprises making the information available through a network connection to a client who has paid or has contracted to pay the fee.

14. The method of claim 13, wherein said making the information available through a network connection comprises:
receiving a request for access to the information from a computer device associated with the client;
determining whether the client has paid or has contracted to pay the fee; and
providing the device with access to the information when the client has paid or has contracted to pay the fee.

15. The method of claim 13, wherein said making information available about the classification for a fee comprises electronically pushing the information to the client.

16. The method of claim 1, wherein said making information available about the classification for a fee comprises:
encoding a computer-readable medium with the information about the classification; and
offering the medium for sale.

17. The method of claim 1, wherein said making information available about the classification for a fee comprises:
encoding a computer-readable medium with computer executable instructions for performing at least one of said generating and said classifying; and
offering the medium for sale.

18. A system for providing access to earnings quality information, the system comprising:
an electronic database comprising:
financial information for a plurality of entities;
a value corresponding to the earnings quality of the plurality of entities, wherein the value correspond to the earnings quality of the entities, and are based on a metric of accruals, and quantify discretionary, non-cash components of earnings for the entity; and
a classification of the plurality of entities according to the values by dividing the distribution of values into groups of related entities to provide an indicator of earnings quality for a single entity relative to the related entities, wherein the earnings quality risk is indicative of future earnings performance, relative returns performance, the likelihood of a future earnings restatement, regulatory enforcement action, or legal enforcement action; and
a server for receiving and processing a request for access to the database from a remote device.

19. The system of claim 18, wherein the server is configured to:
provide the remote device with access to the database when a party associated with the remote device has paid or has contracted to pay an access fee; and
deny the remote device access to the database when the party associated with the remote device has not paid or has not contracted to pay the access fee.

20. The system of claim 18, further comprising an earnings quality application configured to:
generate at least one value corresponding to the earnings quality of the entity using data from at least one financial information database; and
store at least one value in the database comprising at least one value.

21. The system of claim 20, wherein the entity comprises a financial services entity and wherein the earnings quality application is further configured to:
retrieve financial data for the financial services entity from a first database;
retrieve financial data for the financial services entity from a second database; and
generate at least one value corresponding to earnings quality for the financial services entity using the data from the first and the second databases.

22. The system of claim 21, wherein:
the first database comprises the S&P Compustat database;
the second database comprises the SNL database; and
the financial data retrieved from the SNL database comprises data for total investments of the financial services entity.

23. The system of claim 18, further comprising an earnings quality application configured to:
generate at least one value corresponding to earnings quality for the entity using data uploaded to the server from the remote device; and
store at least one value in the database comprising at least one value.

24. A non-transitory computer readable medium encoded with computer-executable instructions for performing the method comprising:
receiving financial information for a plurality of entities;
generating at least one value corresponding to earnings quality for one of the plurality of entities, wherein the at least one value corresponding to the earnings quality of the entity, wherein the value is based on a metric of accruals and quantified discretionary, non-cash components of earnings for the entity; and
classifying the entity according to the generated values by dividing the distribution of values into groups of related entities to provide an indicator of earnings quality for the entity relative to the related entities, wherein the earnings quality is indicative of future earnings performance, relative returns performance, the likelihood of a future earnings restatement, regulatory enforcement action, or legal enforcement action.

* * * * *